(12) United States Patent
Hong et al.

(10) Patent No.: US 12,338,145 B2
(45) Date of Patent: Jun. 24, 2025

(54) PLASMA WATER TREATMENT APPARATUS FOR REMOVING COLOR WITH RESTRAINING TOTAL NITROGEN AND METHOD THEREOF

(71) Applicant: KOREA INSTITUTE OF FUSION ENERGY, Daejeon (KR)

(72) Inventors: Yong Cheol Hong, Goyang-si (KR); Yong Wook Shin, Gunsan-si (KR); Kang Il Kim, Jeonju-si (KR); Seong Il Hong, Yangju-si (KR); Hee Jae Lee, Gunsan-si (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 500 days.

(21) Appl. No.: 17/856,111

(22) Filed: Jul. 1, 2022

(65) Prior Publication Data

US 2023/0009958 A1    Jan. 12, 2023

(30) Foreign Application Priority Data

Jul. 9, 2021   (KR) .................. 10-2021-0090524

(51) Int. Cl.
| | | |
|---|---|---|
| C02F 1/46 | (2023.01) | |
| C02F 1/28 | (2023.01) | |
| C02F 1/72 | (2023.01) | |
| C02F 1/78 | (2023.01) | |
| C02F 101/16 | (2006.01) | |

(52) U.S. Cl.
CPC ............ C02F 1/4608 (2013.01); C02F 1/281 (2013.01); C02F 1/725 (2013.01); C02F 1/78 (2013.01); *C02F 2101/16* (2013.01); *C02F 2201/46* (2013.01); *C02F 2201/782* (2013.01); *C02F 2303/18* (2013.01)

(58) Field of Classification Search
CPC ........ C02F 1/4608; C02F 1/281; C02F 1/725; C02F 1/78; C02F 1/008; C02F 1/283; C02F 1/58; C02F 2101/16; C02F 2201/46; C02F 2201/782; C02F 2303/18; C01B 13/11; H05H 1/2406; H05H 1/2418
See application file for complete search history.

(56) References Cited

U.S. PATENT DOCUMENTS

| | | | | |
|---|---|---|---|---|
| 2018/0148353 | A1* | 5/2018 | Foster | ........................ C02F 1/72 |
| 2020/0115259 | A1* | 4/2020 | Hong | .................... C02F 1/4608 |

FOREIGN PATENT DOCUMENTS

| | | |
|---|---|---|
| JP | 2014-159008 | 9/2014 |
| JP | 2014159008 A * | 9/2014 |
| JP | 2015-139752 | 8/2015 |
| KR | 10-0428841 | 8/2004 |
| KR | 10-2005-0105663 | 11/2005 |

(Continued)

OTHER PUBLICATIONS

Volksen et. el. "Low dielectric constant materials". Chem. Rev. 2010, 110, 56-110. (Year: 2010).*

*Primary Examiner* — Liam Royce
(74) *Attorney, Agent, or Firm* — LEX IP MEISTER, PLLC (57) ABSTRACT

A plasma water treatment apparatus includes a plasma generator that generates plasma in water, and a porous dielectric that adsorbs nitrogen oxide generated in the water, surrounds the plasma generator, and includes silicon dioxide powder and carbon powder, thereby removing color of wastewater.

11 Claims, 13 Drawing Sheets
(5 of 13 Drawing Sheet(s) Filed in Color)

(56) References Cited

FOREIGN PATENT DOCUMENTS

| KR | 20050105663 | * | 11/2005 |
| KR | 10-2009-0110060 | | 10/2009 |
| KR | 10-2015-0018714 | | 2/2015 |
| KR | 20150018714 | * | 2/2015 |
| KR | 10-1902331 | | 10/2018 |

* cited by examiner

PRE-​TREATMENT​ POST-​TREATMENT
TN: 25ppm​ 28ppm
COLOR: 110​ 40.8

12 LITERS @ 100W
PROCESSING FOR 25 MINUTES

FIG. 8

- COMPARATIVE EXAMPLE

COLOR: 114°
TN: 24 ppm

COLOR: 40°
TN: 32 ppm

FIG. 9

FIG. 10 a. MOVE EFFLUENT PRE-TREATMENT TANK
b. MOVE EFFLUENT PLASMA WATER TREATMENT TANK
c. PLASMA
d. GENERATE OZONE
e. REUSE EXHAUSTED OZONE
f. DISCHARGE UNDERWATER PLASMA ULTRA-HIGH TREATED WATER
g. REACT WITH LOW-CONCENTRATION EXHAUSTED OZONE REMOVAL CATALYST
h. DISCHARGE

FIG. 11

PLASMA WATER TREATMENT APPARATUS FOR REMOVING COLOR WITH RESTRAINING TOTAL NITROGEN AND METHOD THEREOF

CROSS-REFERENCE TO RELATED APPLICATION

This application claims priority to and the benefit of Korean Patent Application No. 10-2021-0090524 filed in the Korean Intellectual Property Office on Jul. 9, 2021, the entire contents of which are incorporated herein by reference.

BACKGROUND OF THE INVENTION

(a) Field of the Invention

A plasma water treatment apparatus for removing color with restraining total nitrogen and a method thereof are provided.

(b) Description of the Related Art

Plasma apparatuses are being used in the fields of surface treatment, purification of contaminated water, soil restoration, and food sterilization. In general, an underwater plasma apparatus may purify wastewater by oxidizing and decomposing the wastewater by reacting with various harmful substances present in water by plasma.

The plasma apparatus for purifying wastewater is a plasma apparatus generated using air, and both the low-temperature plasma apparatus and the high-temperature plasma apparatus inevitably generate nitrogen oxide. For example, nitrogen oxide includes NO, $NO_2$, and the like.

Accordingly, when plasma is generated in water to remove color of the wastewater, the color of the wastewater is removed, but total nitrogen (TN) increases, which may cause a problem in the wastewater purification process.

As a related prior document, Korean Patent No. 10-0428841 discloses "a nitrogen oxide removal method in a low-temperature plasma process using propylene and ozone," and Korean Patent 10-1902331 discloses "a nitrogen oxide reduction system using microwave plasma based on a selective non-catalytic reduction method."

The above information disclosed in this Background section is only for enhancement of understanding of the background of the invention, and therefore it may contain information that does not form the prior art that is already known in this country to a person of ordinary skill in the art.

SUMMARY OF THE INVENTION

Exemplary embodiments may be used to remove color with restraining total nitrogen during wastewater processing.

An exemplary embodiment provides a plasma water treatment apparatus, including: a plasma generator that generates plasma in water; and a porous dielectric that adsorbs nitrogen oxide generated in the water, surrounds the plasma generator, and includes silicon dioxide powder and carbon powder, thereby removing color of wastewater.

The plasma generator may include a hollow internal electrode into which a source gas is injected, an external dielectric that surrounds the internal electrode and includes a plurality of holes, and a power supply source that applies power to the internal electrode, and the injected source gas in a space between the internal electrode and the external dielectric may be discharged to generate plasma, and the plasma is discharged through a plurality of holes in the external dielectric.

The plasma generator may further include a coating layer that surrounds the external dielectric and includes a plurality of fine holes.

The plasma generator may further include an intermediate dielectric that surrounds the internal electrode and is positioned between the internal electrode and the external dielectric.

The plasma generator may further include a holder that supports the internal electrode and the external dielectric.

The holder may include a gas inlet that injects the source gas into the internal electrode.

One end portion of the external dielectric may further protrude than one end portion of the internal electrode, and have a cone shape.

The plasma generator may further include a micro bubbler that surrounds the external dielectric, and the plasma may be discharged through the micro bubbler.

An exemplary embodiment provides a water treatment system, including: an effluent pump that pumps wastewater; a pre-treatment tank into which the wastewater is introduced through the effluent pump; an underwater plasma water treatment tank into which pre-treated water is introduced from the pre-treatment tank, and that plasma-treats the pre-treated water and includes a plasma water treatment apparatus; an underwater plasma treated water pump that pumps and discharges the plasma treated water from the underwater plasma water treatment tank; and a plasma control panel that controls the effluent pump, the pre-treatment tank, the underwater plasma water treatment tank, and the underwater plasma treated water pump, in which the plasma water treatment apparatus may include a plasma generator that generates plasma in water, and a porous dielectric that adsorbs nitrogen oxide generated in the water, surrounds the plasma generator, and includes silicon dioxide powder and carbon powder.

Ozone may be generated in the underwater plasma water treatment tank, and exhausted ozone remaining undissolved may be reused in the pre-treatment tank.

The water treatment system may further include a capacitor that is connected to the pre-treatment tank and includes an ozone removal catalyst.

An exemplary embodiment provides a plasma water treatment method, including: generating plasma in water by a plasma generator; adsorbing nitrogen oxide generated in the water by a porous dielectric that surrounds the plasma generator and includes silicon dioxide powder and carbon powder; and removing color of wastewater by plasma generated in the water.

The generating of the plasma may include injecting a source gas into the plasma generator that includes a hollow internal electrode and an external dielectric surrounding the internal electrode, discharging the injected source gas in a space between the internal electrode and the external dielectric to generate plasma, and discharging the plasma through a plurality of fine holes in the external dielectric.

According to an exemplary embodiment, it is possible to remove color with restraining total nitrogen during wastewater processing.

BRIEF DESCRIPTION OF THE DRAWINGS

The patent or application file contains at least one drawing executed in color. Copies of the patent or patent application

DETAILED DESCRIPTION OF THE EMBODIMENTS

Hereinafter, exemplary embodiments of the present invention will be described in detail with reference to the accompanying drawings so that those skilled in the art to which the present invention pertains may easily practice the present invention. As those skilled in the art would realize, the described embodiments may be modified in various different ways, all without departing from the spirit or scope of the present invention. In order to clearly explain the present invention in the drawings, parts irrelevant to the description are omitted, and the same reference numerals are used for the same or similar components throughout the specification. In addition, in the case of a well-known known technology, a detailed description thereof will be omitted.

Throughout the specification, unless explicitly described to the contrary, the word "comprise" and variations such as "comprises" or "comprising", will be understood to imply the inclusion of stated elements but not the exclusion of any other elements.

Then, a plasma water treatment apparatus according to an exemplary embodiment will be described in detail.

Figure 1:
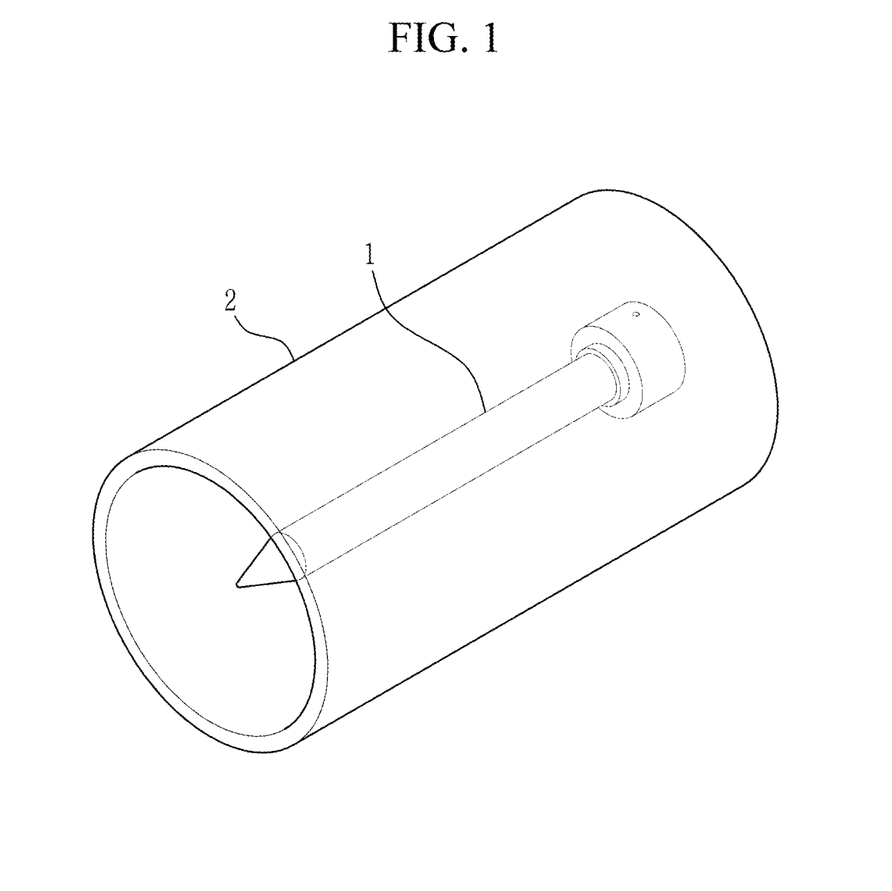
FIG. 1 is a perspective view schematically illustrating a plasma water treatment apparatus according to an exemplary embodiment.
Figure 2A:
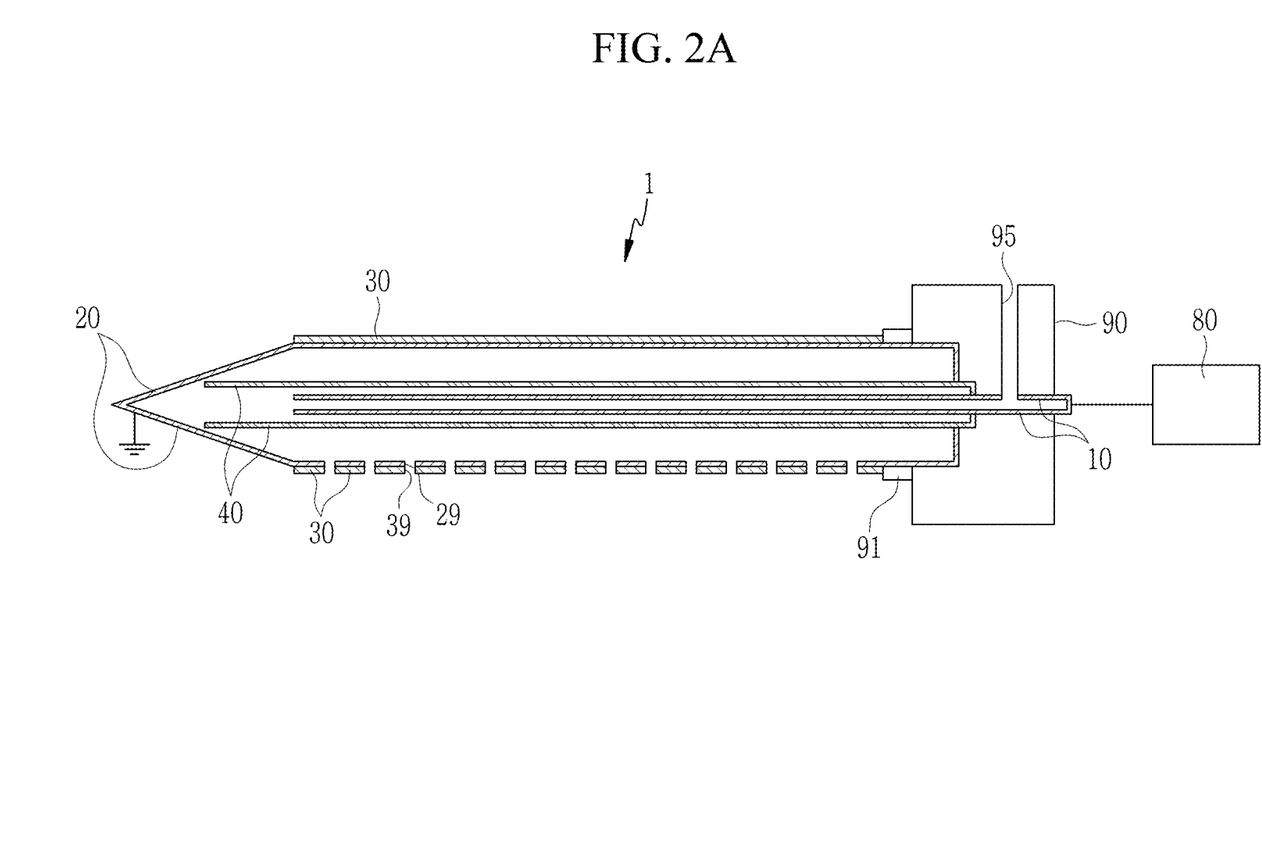
FIGS. 2A and 2B are cross-sectional views schematically illustrating a plasma generator of FIG. 1.
Figure 2B:
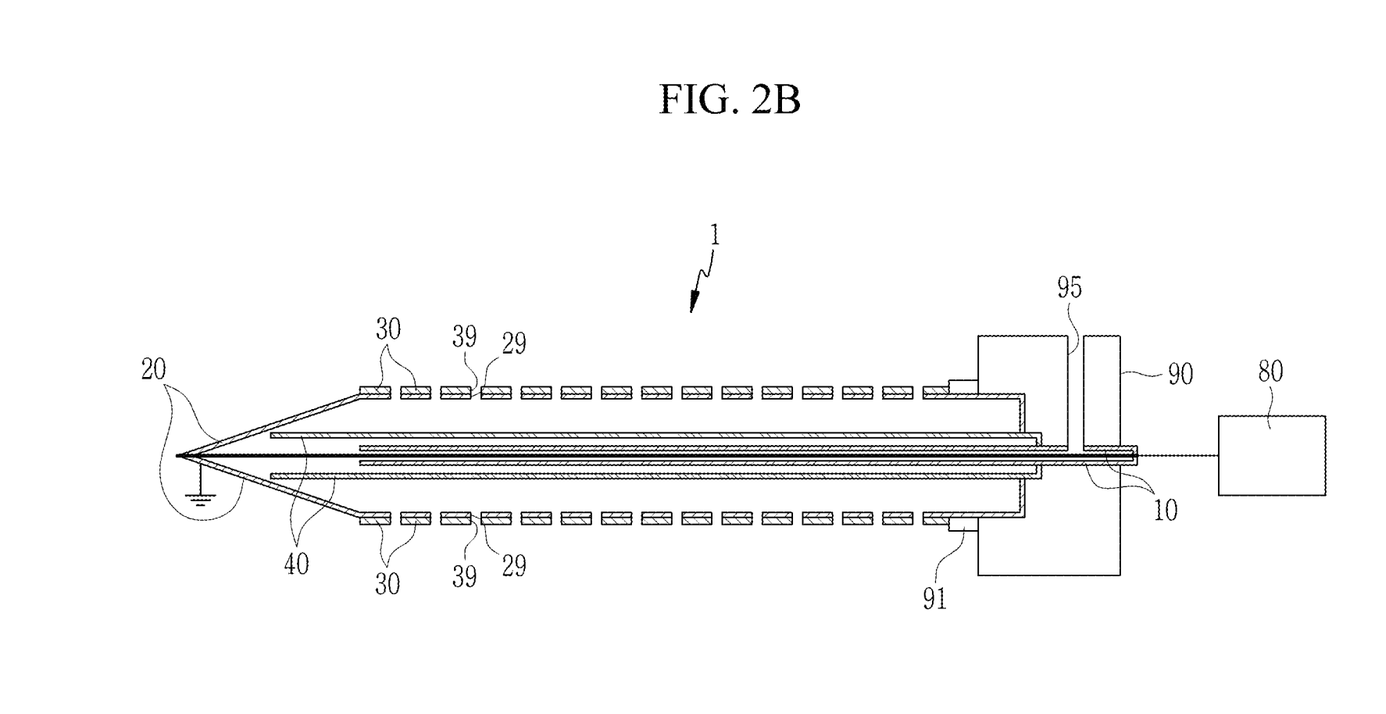
Figure 3:
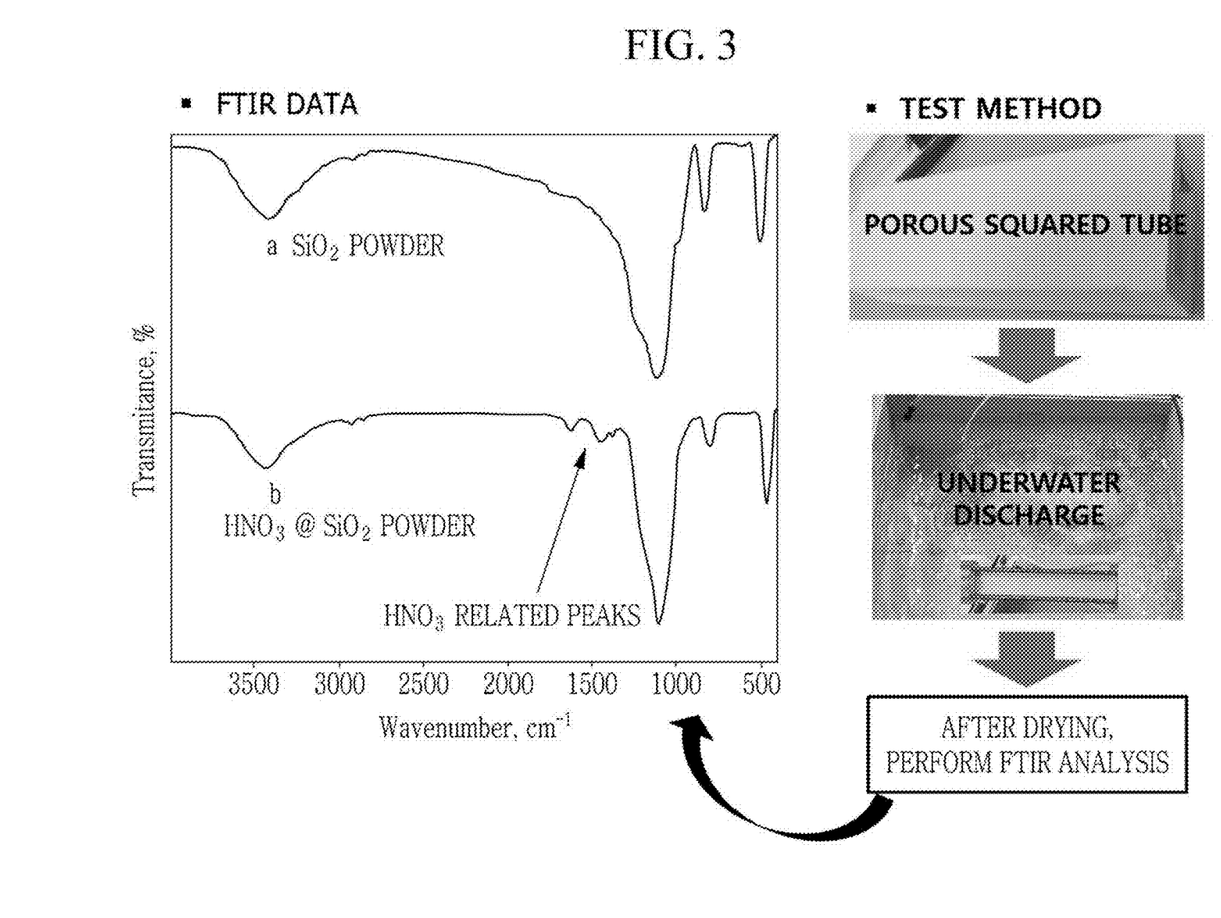
FIG. 3 is an FTIR graph when discharging underwater using the plasma water treatment device of FIG. 1.

FIG. 1 is a perspective view schematically illustrating a plasma water treatment apparatus according to an exemplary embodiment, FIGS. 2A and 2B are cross-sectional views schematically illustrating a plasma generator of FIG. 1, and FIG. 3 is an FTIR graph when discharging underwater using the plasma water treatment device of FIG. 1.

Referring to FIGS. 1 and 2A and 2B, the plasma water treatment apparatus includes a plasma generator 1 that generates plasma when power is applied, and a porous dielectric 2 that adsorbs nitrogen oxides.

The porous dielectric 2 may adsorb nitrogen oxides and may be a hollow tube. For example, the hollow tube may be a cylindrical tube or a polygon tube such as a squared tube. In addition, the porous dielectric 2 may be manufactured by molding a composition including silicon dioxide powder, carbon powder, and a binder through a mold, and then heat-treating the composition.

Referring to FIG. 3, when the porous dielectric 2 is a squared tube, FTIR analysis is performed after discharging and drying in water. It appears that the porous dielectric 2 has absorbed nitrogen oxide.

The plasma generator 1 includes an internal electrode 10 of a hollow space type into which source gas is injected, an external dielectric 20 that surrounds an internal electrode 10 and includes a plurality of holes 29, a coating layer 30 that surrounds an external dielectric 20 and includes a plurality of fine holes 39, and a power supply source 80 that applies power to the internal electrode 10.

The injected source gas in the space between the internal electrode 10 and the external dielectric 20 is discharged to generate plasma, and the plasma is discharged through the plurality of fine holes 29 of the external dielectric 20 and the plurality of fine holes of the coating layer 30. The plurality of fine holes 29 of the external dielectric 20 and the plurality of fine holes 39 of the coating layer 30 are connected to each other. In the range such that the water pressure is kept constant, the plurality of fine holes 39 of the coating layer 30 and the plurality of fine holes 29 of the external dielectric 20 may also be formed on opposite sides.

When the plasma generator 1 is disposed in water in a horizontal direction, the plurality of fine holes 39 of the coating layer 30 and the plurality of fine holes 29 of the external dielectric 20 may be arranged so that a water pressure is equally applied. In addition, when the plasma generator 1 is disposed in water in a vertical direction, a size and water pressure of the plurality of fine holes 39 of the coating layer 30 and the plurality of fine holes 29 of the external dielectric 20 are calculated, so sizes and positions of the plurality of fine holes 29 and 39 may be designed differently.

The coating layer 30 is a layer that coats the external dielectric 20. Since the coating layer 30 surrounds the external dielectric 20, the source gas may be uniformly discharged, and thus, plasma generation efficiency may increase.

For example, the coating layer 30 may include a carbon-based material. When the coating layer 30 includes the carbon-based material, heat transfer may increase, and cooling efficiency may increase, and thus plasma generation efficiency may further increase. For example, the carbon-based material may include graphite, carbon nanotubes, graphene, and the like. In addition, the coating layer may further include a metal such as nickel, copper, silver, or gold as an auxiliary component together with the carbon-based material, and thus, the stability and heat transfer efficiency of the coating layer may increase.

The internal electrode 10 is a hollow tube through which the source gas passes. For example, the source gas may be supplied to one end portion of the internal electrode 10, and the source gas may be discharged to the other end portion of the internal electrode 10. The internal electrode 10 is connected to the power supply source 80, and power is supplied to the internal electrode 10. The internal electrode 10 may be made of metal. For example, the internal electrode 10 may be made of stainless steel, tungsten, titanium, molybdenum, or an alloy including one or more thereof. In addition, the internal electrode 10 may be made of stainless steel having excellent workability.

The source gas injected into the internal electrode 10 may be injected by a gas supply unit. For example, as the source gas, one or more inert gases such as air, carbon dioxide, oxygen, argon, and helium may be mixed.

The external dielectric 20 is a hollow tube surrounding the internal electrode, and includes the plurality of holes 29 through which plasma is discharged. The external dielectric 20 may function as a dielectric and an electrode at the same time, and is grounded. For example, the external dielectric 20 may be a quartz tube.

One end portion of the external dielectric 20 may further protrude than one end portion of the internal electrode 10. Accordingly, the source gas may be more efficiently discharged between the internal electrode 10 to which power is applied and the external dielectric 20. For example, one end portion of the external dielectric 20 may have a cone shape. In addition, the coating layer 30 is not formed on one end portion of the external dielectric. In addition, the internal electrode 10 has the same or smaller length as or than the coating layer 30 in a longitudinal direction, so the plasma may be efficiently generated.

The plasma generator 1 surrounds the internal electrode 10, is positioned between the internal electrode 10 and the external dielectric 20, and may include an intermediate dielectric 40 that is a hollow tube.

The source gas discharged from the internal electrode 10 may be filled between the internal electrode 10 and the intermediate dielectric 40 and discharged to one end portion of the intermediate dielectric 40, and the source gas may be filled between the intermediate dielectric 40 and the external dielectric 20 and may be discharged. Accordingly, due to the intermediate dielectric 40, the discharge of the source gas may occur uniformly, and the plasma generation efficiency may increase.

For example, the intermediate dielectric 40 may be an alumina tube. When the alumina tube is used, the uniformity of the discharge may further increase.

The plasma generator 1 may further include a holder 90 supporting the internal electrode 10 and the external dielectric 20. The holder 90 injects the source gas into the internal electrode 10 through the gas inlet 95. The holder 90 may further include an auxiliary part 91 supporting the external dielectric 20.

Figure 4:
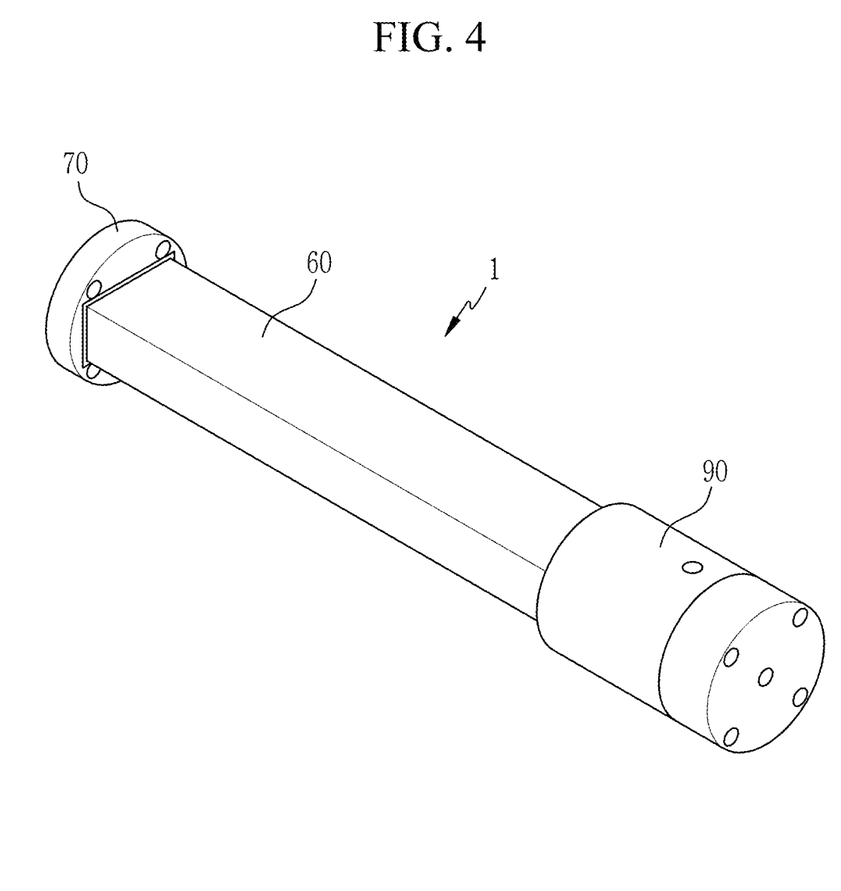
FIG. 4 is a perspective view schematically illustrating a plasma generator according to an exemplary embodiment.
Figure 5A:
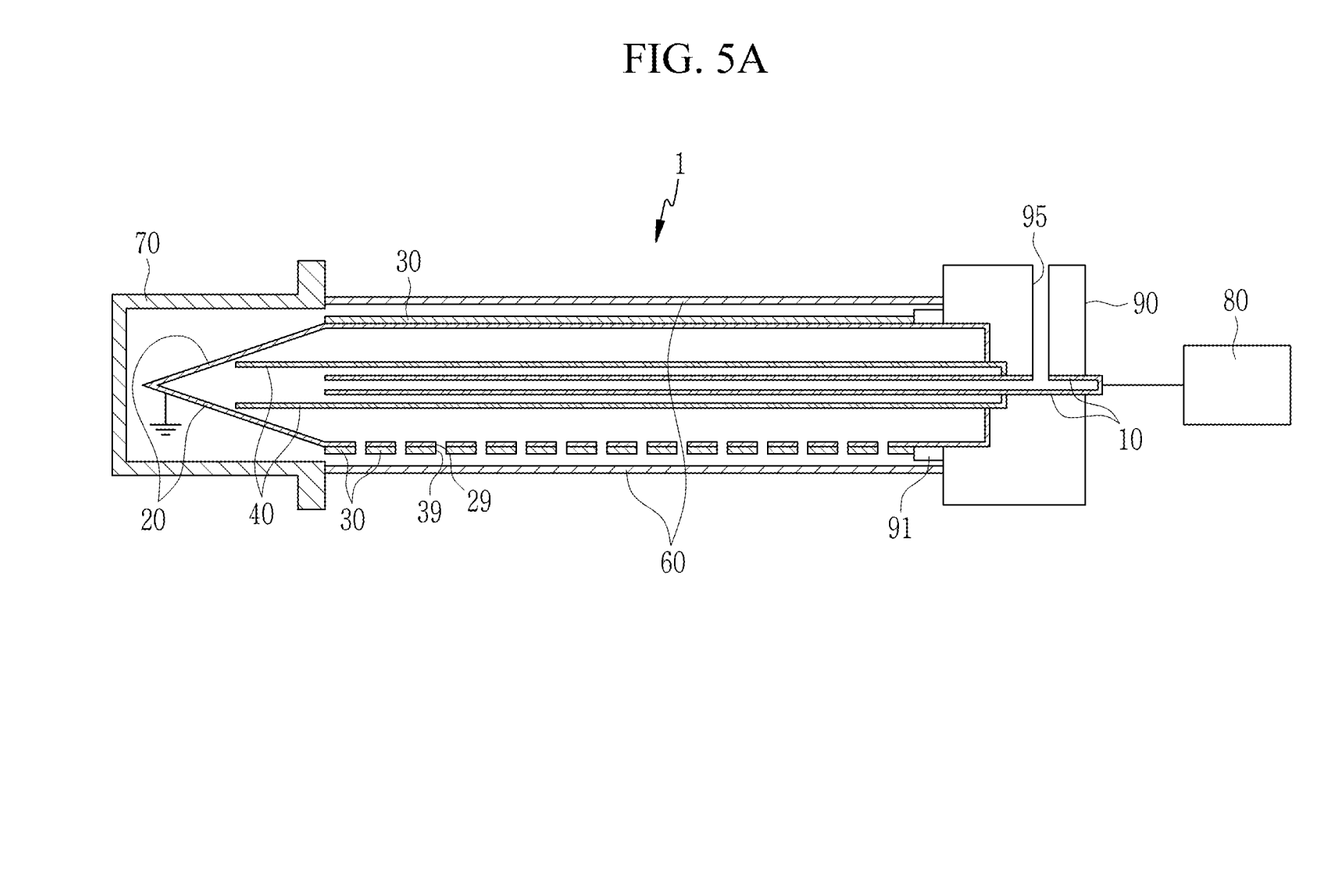
FIGS. 5A and 5B are cross-sectional views schematically illustrating a plasma generator of FIG. 4.
Figure 5B:
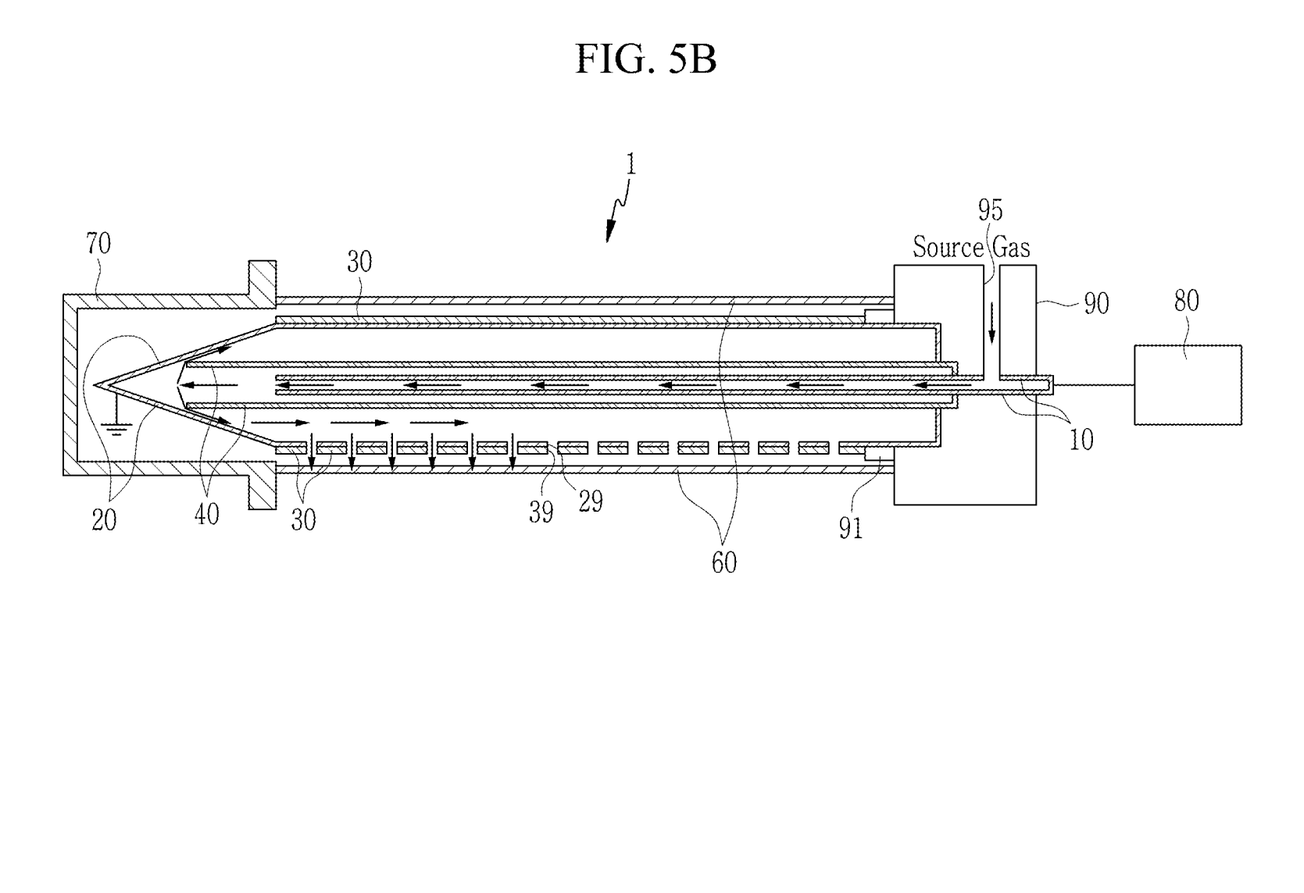

FIG. 4 is a perspective view schematically illustrating a plasma generator according to an exemplary embodiment, and FIGS. 5A and 5B are cross-sectional views schematically illustrating a plasma generator of FIG. 3. In FIGS. 5A and 5B, among the configurations of the plasma generator of FIG. 4, descriptions of components overlapping those of the plasma generator of FIGS. 1 and 2 will be omitted.

Referring to FIGS. 4 and 5A and 5B, the plasma generator 1 further includes a micro bubbler 60 that surrounds the external dielectric 20.

The micro bubbler 60 is configured with a porous membrane, and may generate micro bubbles. The plasma discharged from the external dielectric 20 is discharged through the micro bubbler 60 in the form of micro bubbles. Accordingly, the plasma generation efficiency may further increase due to the use of the micro bubbler 60.

The micro bubbler 60 may have a shape such as a polygonal tube or a cylindrical tube.

The micro bubbler 60 may be sealed by a cap 70.

Figure 6:
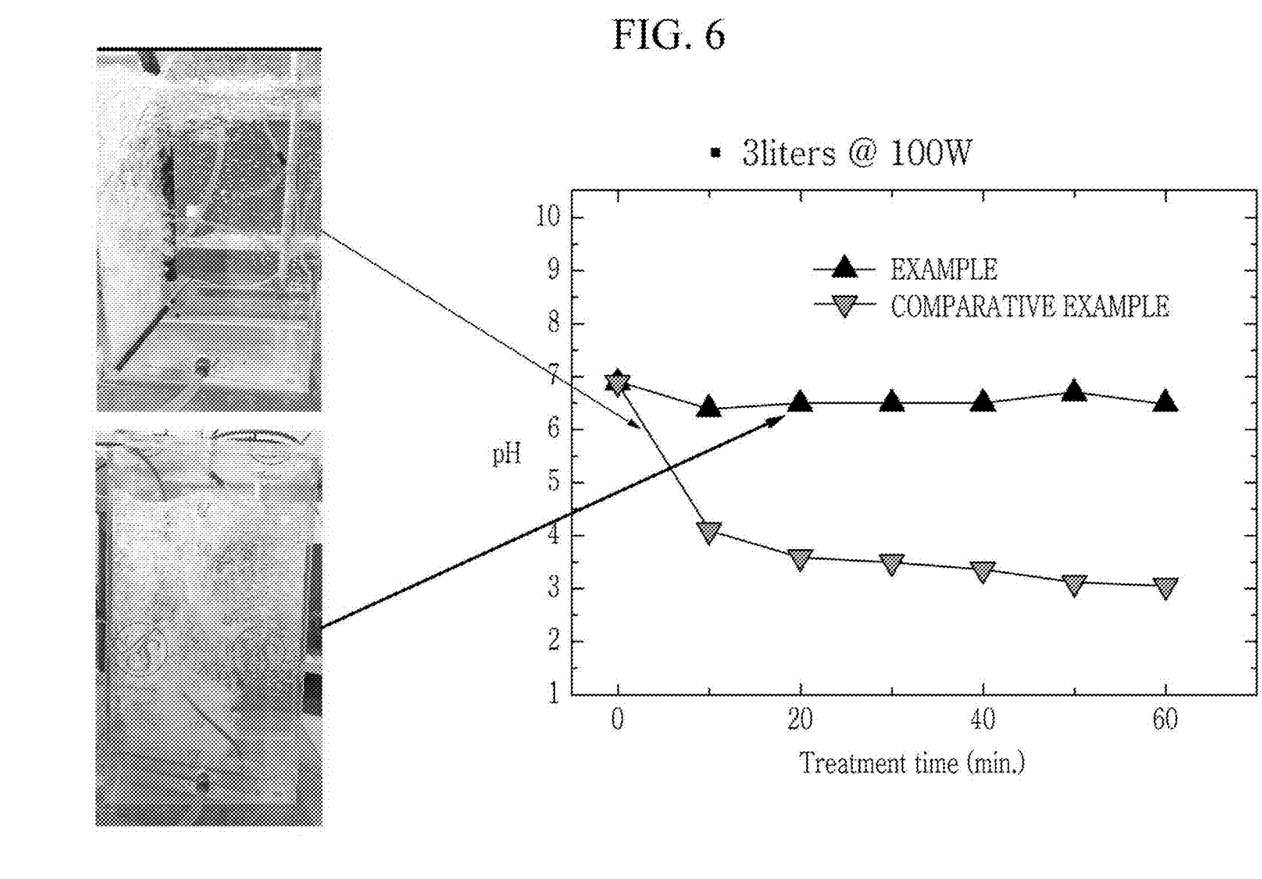
FIG. 6 is a graph illustrating the amount of nitrogen oxide generated during water treatment according to Example and Comparative Example.
Figure 7:
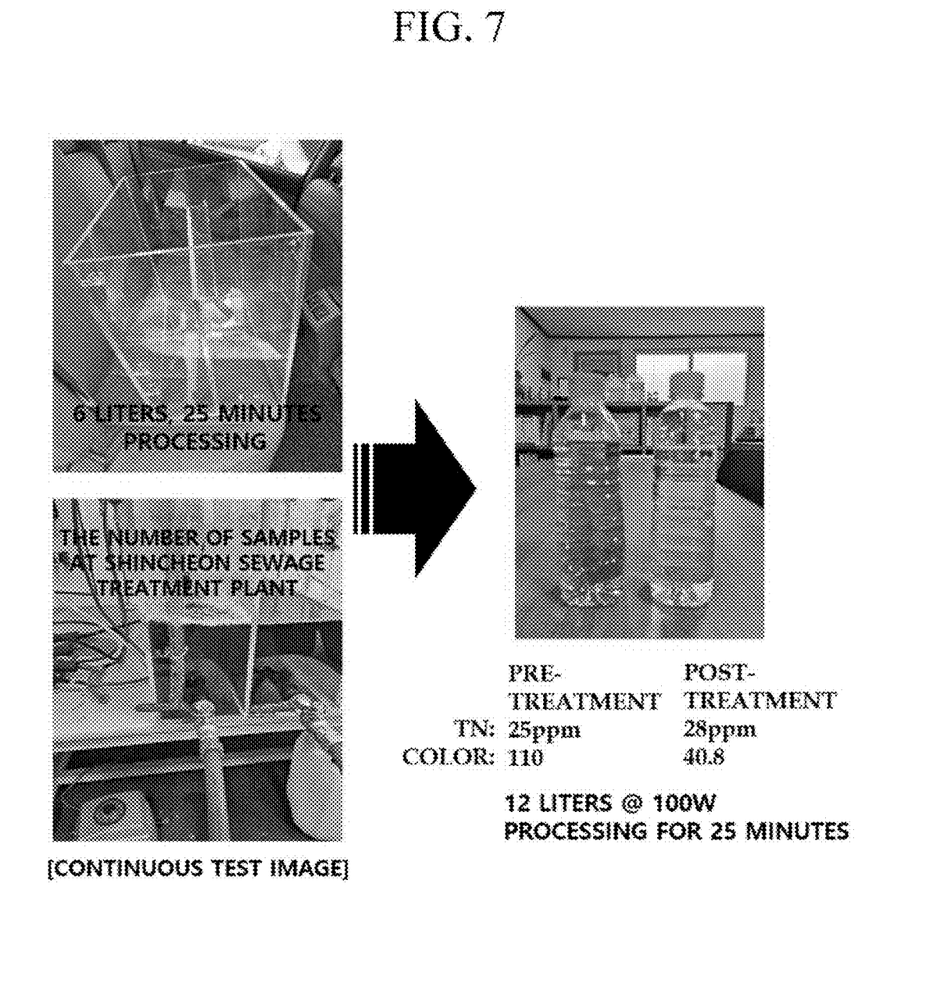
FIG. 7 is a photograph illustrating results of measuring color and total nitrogen when the plasma water treatment apparatus according to an exemplary embodiment is used.
Figure 8:
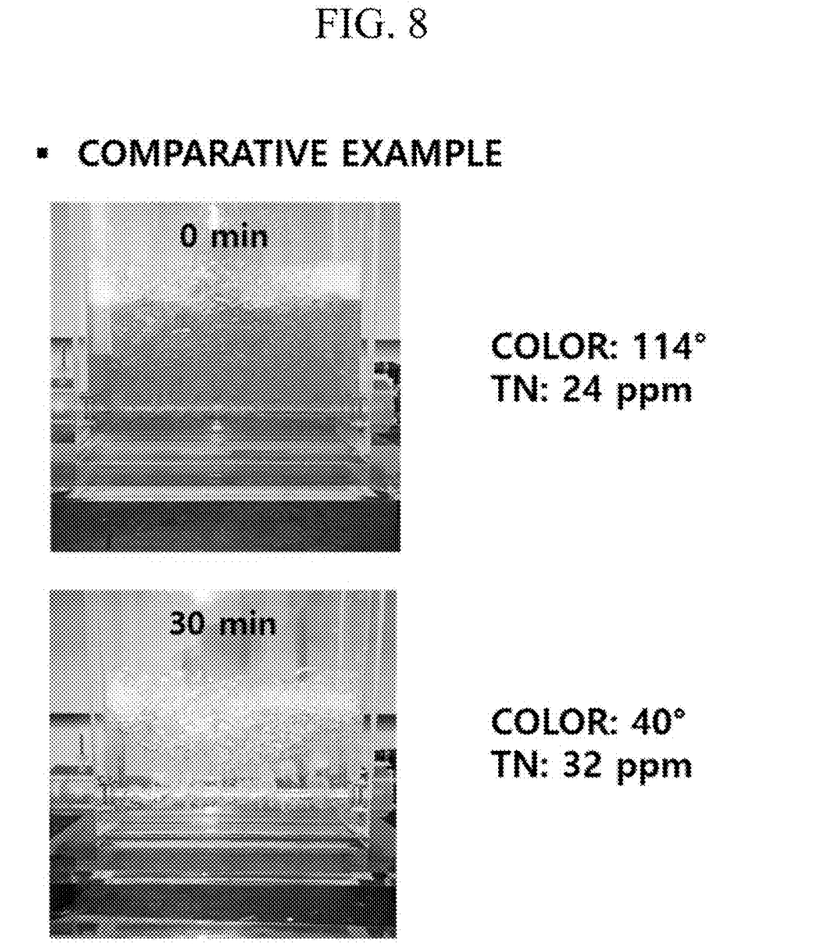
FIG. 8 is a photograph illustrating results of measuring color and total nitrogen in Comparative Example.

FIG. 6 is a graph illustrating the amount of nitrogen oxide generated during water treatment according to Example and Comparative Example, FIG. 7 is a photograph illustrating results of measuring color and total nitrogen when the plasma water treatment apparatus according to an exemplary embodiment is used, and FIG. 8 is a photograph illustrating results of measuring color and total nitrogen in Comparative Example.

Referring to FIG. 6, when using the plasma water treatment apparatus according to an exemplary embodiment (Example, 3 L, 100 W), pH of water is maintained according to a water treatment time. This means that nitrogen oxide is absorbed through the porous dielectric 2. In the case of using the conventional plasma water treatment apparatus without a porous dielectric (Comparative Example, 3 L, 100 W), the pH of water decreases as the water treatment time passes. This is a decrease in pH due to nitrogen oxides generated through plasma.

Referring to FIG. 7, when water treatment is performed using the plasma water treatment apparatus according to an exemplary embodiment (12 L, 100 W, 25 minutes) for the number of samples at the Shincheon sewage treatment plant, the total nitrogen and color before and after treatment appear. The color decreases from 110° to 40.8°, and the total nitrogen is maintained at 25 ppm to 28 ppm.

Referring to FIG. 8, when the conventional plasma water treatment apparatus without a porous dielectric is used (Comparative Examples, 3 L, 100 W), the total nitrogen and color before and after treatment appear. The color decreases from 114° to 40°, and the total nitrogen increases from 24 ppm to 32 ppm.

Then, a water treatment system according to an exemplary embodiment will be described in detail.

Figure 9:
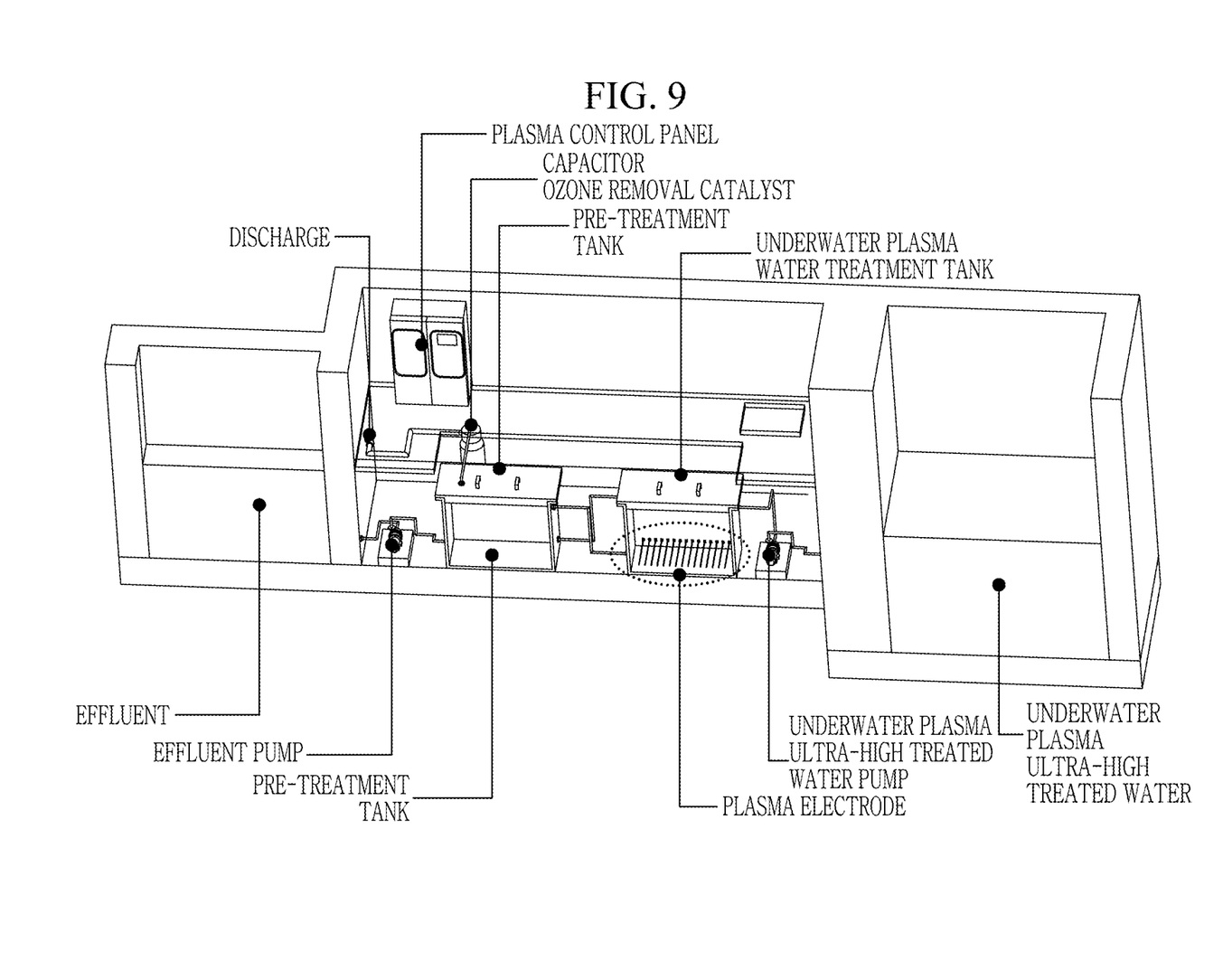
FIG. 9 is a schematic diagram illustrating a water treatment system using a plasma water treatment apparatus according to an exemplary embodiment.
Figure 10:
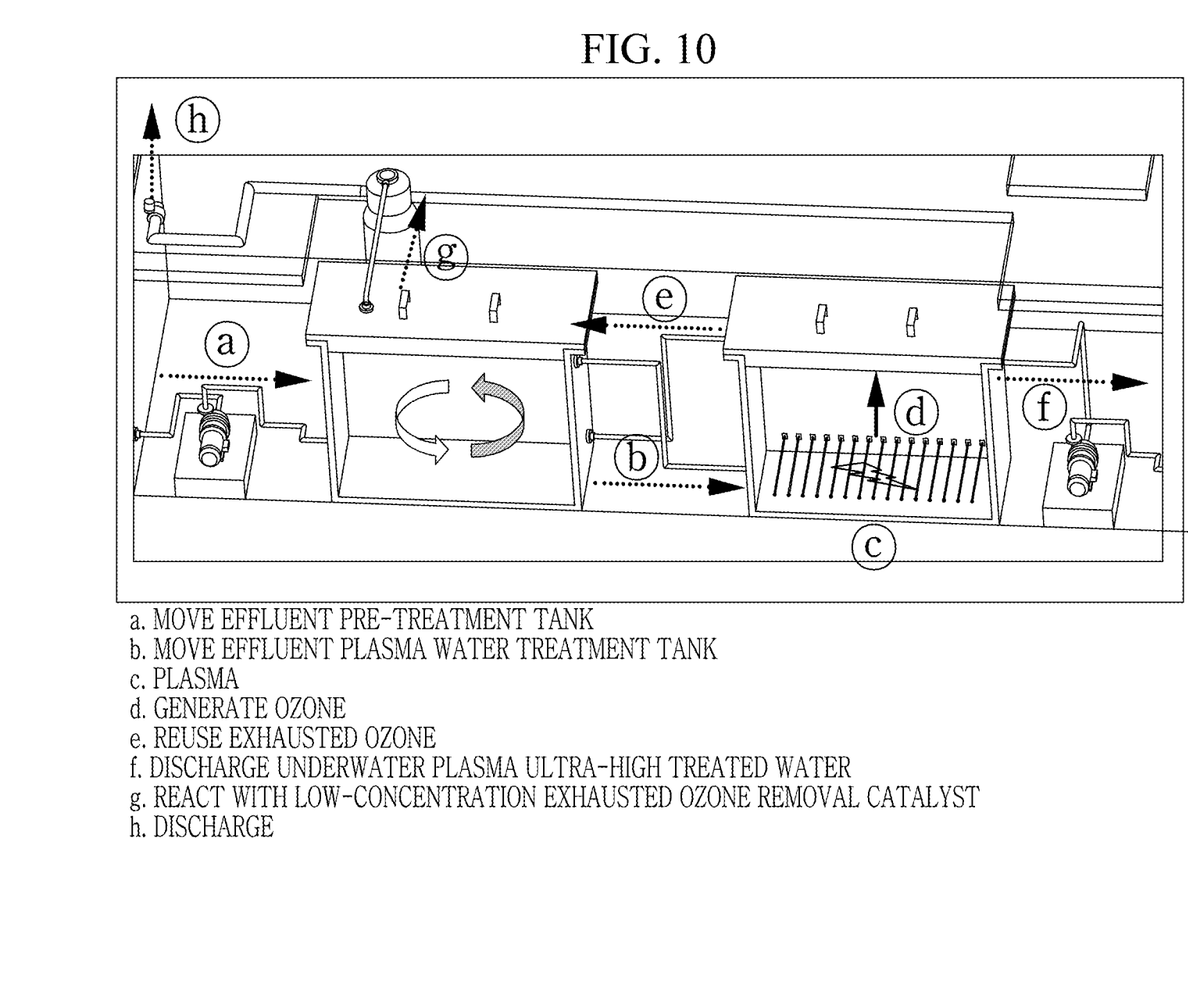
FIG. 10 is a schematic diagram illustrating a process of the water treatment system of FIG. 9.
Figure 11:
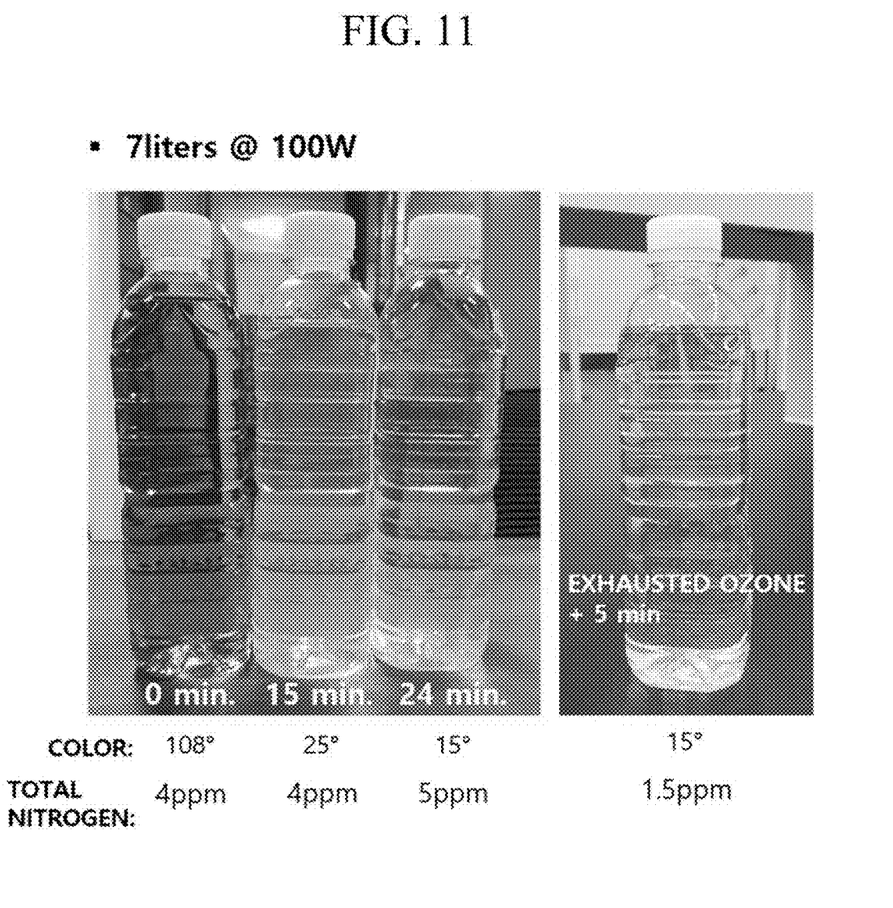
FIG. 11 is a photograph illustrating results of measuring color and total nitrogen when the water treatment system of FIG. 9 is used.

FIG. 9 is a schematic diagram illustrating a water treatment system using a plasma water treatment apparatus according to an exemplary embodiment, FIG. 10 is a schematic diagram illustrating a process of the water treatment system of FIG. 9, and FIG. 11 is a photograph illustrating results of measuring color and total nitrogen when the water treatment system of FIG. 9 is used.

Referring to FIGS. 9 and 10, the water treatment system includes an effluent pump, a pre-treatment tank, an underwater plasma water treatment tank, an underwater plasma treatment water pump, and a plasma control panel.

The effluent pump pumps wastewater. The wastewater is introduced into the pre-treatment tank through the effluent pump. The pre-treated water treated in the pre-treatment tank is introduced into the underwater plasma water treatment tank. The plasma is generated by the plasma water treatment apparatus according to an exemplary embodiment installed in the underwater plasma water treatment tank, ozone is generated, and the pre-treated water is plasma-treated. The plasma water treatment apparatus according to an exemplary embodiment is the plasma water treatment apparatus described with reference to FIGS. 1 to 5. The exhausted ozone remaining undissolved in the underwater plasma water treatment tank is reused in the pre-treatment tank. The plasma treated water treated in the underwater plasma water treatment tank is discharged through the underwater plasma treatment water pump. A capacitor connected to the pre-treatment tank includes an ozone removal catalyst, and the exhausted ozone reacts with the ozone removal catalyst and is discharged to the outside. The pre-treatment tank, the water treatment tank, the pump, the capacitor, etc., are controlled by the plasma control panel.

Referring to FIG. 11, when the water treatment system of FIG. 9 is used (7 L, 100 W), the color and total nitrogen before and after treatment appear. As the water treatment time increases, the color decreases to 108°, 25°, and 15°, and the total nitrogen is maintained at 1 ppm, 4 ppm, and 5 ppm. In case of reusing the exhausted ozone, the color is 15° and the total nitrogen is 1.5 ppm.

Then, a plasma water treatment method according to an exemplary embodiment will be described in detail.

The plasma water treatment method includes generating plasma in water by a plasma generator, adsorbing nitrogen oxide generated in the water by a porous dielectric that surrounds the plasma generator and includes silicon dioxide powder and carbon powder, and removing color of wastewater by plasma generated in the water.

The generating of the plasma may include injecting a source gas into the plasma generator that includes a hollow internal electrode and an external dielectric surrounding the internal electrode, discharging the injected source gas in a space between the internal electrode and the external dielectric to generate plasma, and discharging the plasma through a plurality of micro-holes in the external dielectric.

The plasma generator is the same as the plasma generator 1 of the plasma water treatment apparatus of FIGS. 1 to 5.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A plasma water treatment apparatus for removing color of wastewater, comprising:
   a plasma generator that generates plasma in water; and
   a porous dielectric that adsorbs nitrogen oxide generated in the water, surrounds the plasma generator, and is made by heat-treating a composition comprising silicon dioxide powder and carbon powder.

2. The plasma water treatment apparatus of claim 1, wherein:
   the plasma generator includes:
   a hollow internal electrode into which a source gas is injected;
   an external dielectric that surrounds the internal electrode, includes a plurality of holes, and is surrounded by the porous dielectric; and
   a power supply source that applies power to the internal electrode, and
   an injected source gas in a space between the internal electrode and the external dielectric is discharged to generate plasma, and the plasma is discharged through a plurality of holes in the external dielectric.

3. The plasma water treatment apparatus of claim 2, wherein:
   the plasma generator further includes a coating layer that surrounds the external dielectric and includes a plurality of fine holes.

4. The plasma water treatment apparatus of claim 2, wherein:
   the plasma generator further includes an intermediate dielectric that surrounds the internal electrode and is disposed between the internal electrode and the external dielectric.

5. The plasma water treatment apparatus of claim 2, wherein:
   the plasma generator further includes a holder that supports the internal electrode and the external dielectric.

6. The plasma water treatment apparatus of claim 5, wherein:
   the holder includes a gas inlet that injects the source gas into the internal electrode.

7. The plasma water treatment apparatus of claim 2, wherein:
   one end portion of the external dielectric further protrudes than one end portion of the internal electrode, and has a cone shape.

8. The plasma water treatment apparatus of claim 2, wherein:
   the plasma generator further includes a micro bubbler that surrounds the external dielectric, and the plasma is discharged through the micro bubbler.

9. A water treatment system, comprising:
   an effluent pump that pumps wastewater;
   a pre-treatment tank into which the wastewater is introduced through the effluent pump;
   an underwater plasma water treatment tank into which pre-treated water is introduced from the pre-treatment tank, and that plasma-treats the pre-treated water and includes a plasma water treatment apparatus;
   an underwater plasma treated water pump that pumps and discharges plasma treated water from the underwater plasma water treatment tank; and
   a plasma control panel that controls the effluent pump, the pre-treatment tank, the underwater plasma water treatment tank, and the underwater plasma treated water pump,
   wherein the plasma water treatment apparatus includes:
   a plasma generator that generates plasma in water, and
   a porous dielectric that adsorbs nitrogen oxide generated in the water, surrounds the plasma generator, and includes silicon dioxide powder and carbon powder.

10. The water treatment system of claim 9, wherein:
    the underwater plasma water treatment tank generates ozone, and the pre-treatment tank reuses exhausted ozone remaining undissolved.

11. The water treatment system of claim 9, further comprising:
    a capacitor that is connected to the pre-treatment tank and includes an ozone removal catalyst.

* * * * *